US006604132B1

United States Patent
Hitt (10) Patent No.: US 6,604,132 B1
(45) Date of Patent: Aug. 5, 2003

(54) SYSTEM AND METHOD FOR EMBEDDING A PHYSICAL MAILING ADDRESS IN AN ELECTRONIC MAIL ADDRESS

(76) Inventor: David H. Hitt, 4237 Helmsley La., Plano, TX (US) 75093

(*) Notice: Subject to any disclaimer, the term of this patent is extended or adjusted under 35 U.S.C. 154(b) by 409 days.

(21) Appl. No.: 09/591,050

(22) Filed: Jun. 9, 2000

(51) Int. Cl.[7] .............................. G06F 15/16; G06K 9/00
(52) U.S. Cl. ........................ 709/206; 709/218; 382/101
(58) Field of Search ................................ 709/206, 218; 382/101; 358/1.15

(56) References Cited

U.S. PATENT DOCUMENTS

| 5,648,916 | A | * | 7/1997 | Manduley | |
|---|---|---|---|---|---|
| 5,793,972 | A | * | 8/1998 | Shane | 709/219 |
| 5,805,810 | A | * | 9/1998 | Maxwell | 709/206 |
| 5,812,670 | A | * | 9/1998 | Micali | 705/74 |
| 5,944,787 | A | * | 8/1999 | Zoken | 709/206 |
| 5,987,508 | A | * | 11/1999 | Agraharam et al. | 709/217 |
| 6,014,711 | A | * | 1/2000 | Brown | 709/245 |
| 6,018,761 | A | * | 1/2000 | Uomini | 709/206 |
| 6,025,931 | A | * | 2/2000 | Bloomfield | 358/402 |
| 6,097,797 | A | * | 8/2000 | Oseto | 379/100.08 |
| 6,285,777 | B2 | * | 9/2001 | Kanevsky et al. | 382/101 |
| 6,332,156 | B1 | * | 12/2001 | Cho et al. | 709/206 |
| 6,374,291 | B1 | * | 4/2002 | Ishibashi et al. | 709/206 |
| 6,427,164 | B1 | * | 7/2002 | Reilly | 709/206 |
| 6,429,946 | B1 | * | 8/2002 | Bresnan et al. | 358/1.15 |
| 6,446,115 | B2 | * | 9/2002 | Powers | 709/206 |

* cited by examiner

Primary Examiner—Krisna Lim (57) ABSTRACT

Systems, methods, infrastructures and electronic mail (e-mail) messages are set forth that allow e-mail to be converted to physical mail form and physically mailed to recipients. The e-mail messages themselves carry the data sufficient to identify the physical mailing address of their intended recipients. In one embodiment, an e-mail message transmissible through a computer network and forwardable via a physical mail distribution system includes: (1) a body and (2) a header having physical mailing address data located in an address therein that is employable to forward information contained in the body to a physical mailing address in physical mail form. In embodiments wherein sufficient data regarding the physical mailing address are contained in an e-mail address, various systems and methods are set forth that generate e-mail addresses containing the data. Various systems and methods are also described that convert the e-mail to physical form for physical mailing. A comprehensive infrastructure capable of carrying out worldwide e-mail to physical mail conversion is also taught.

20 Claims, 8 Drawing Sheets

SYSTEM AND METHOD FOR EMBEDDING A PHYSICAL MAILING ADDRESS IN AN ELECTRONIC MAIL ADDRESS

CROSS-REFERENCE TO RELATED APPLICATIONS

The present application is related to the following U.S. Patent applications that are filed concurrently herewith, commonly assigned and incorporated herein by reference:

| Serial No. | Title | Filing Date | Inventor |
|---|---|---|---|
| 09/590,602 | Electronic Mail Address Having Embedded Physical Mailing Address and Electronic Mail Message Containing the Same | June 9, 2000 | Hitt |
| 09/591,353 | Systems and Methods for Forwarding Electronic Mail Based on an Physical Mailing Address Embedded Therein | June 9, 2000 | Hitt |
| 09/590,595 | Electronic Mail to Physical Mail Conversion Infrastructure | June 9, 2000 | Hitt |

TECHNICAL FIELD OF THE INVENTION

The present invention is directed, in general, to electronic mail (e-mail) and, more specifically, to an e-mail message having a physical mailing address embedded therein, systems and methods for embedding physical mailing addresses into an e-mail message, forwarding mail based on an e-mail address and an e-mail to physical mail conversion infrastructure.

BACKGROUND OF THE INVENTION

In recent years, the availability of more efficient, reliable and cost-effective computers and networking tools has allowed many companies and individuals (collectively, "users") to become involved in an ever-growing electronic community. The immeasurable gains in technology experienced by the computer industry overall permit these users to rely on commercially available computers, such as personal computers ("PCS"), to meet their information processing and communication needs. To that end, PC manufacturers allow users to equip most PCS with an interface (such as a modem) that may be used for communication over networks, such as the Internet. The Internet is a well-known collection of networks (e.g., public and private voice, data, video and multimedia networks) that cooperate using common protocols to form a worldwide network of networks.

Cooperation often includes the communication of electronic mail ("e-mail") from one user (a "sender") to another (a "recipient"). One conventional e-mail protocol employed over the Internet, Simplified Mail Transfer Protocol ("SMTP"), mandates that each e-mail message body have a header that includes the sender's e-mail address (a "source address" or a "return address") and the recipient's e-mail address (a "destination address").

Unfortunately, some people purporting to be e-mail capable neglect to check their e-mailboxes regularly. Other people have multiple e-mail accounts, e-mailboxes for some of which they check, others of which they do not. Sometimes, people may forget they even have an e-mail account. Still other people's e-mailboxes are located behind firewalls that restrict incoming e-mail, e.g., in terms of message source address, content, size or attachment. Needless to say, successful communication by e-mail can be a spotty proposition.

Compounding the problem is that not everyone has e-mail capability. In fact, most of the world's people are not currently on the Internet. While unfamiliarity with computers has caused many not to have joined the e-mail revolution, others are highly protective of their privacy or openly distrustful of technology in general. These people therefore intend never to be on the Internet, no matter how compelling the advantages may become. A significant number do not live where Internet access is straightforward. Still others have not the economic resources to make a connection.

Almost everyone has a physical mailing address, however. Postal services around the world have been delivering paper-based ("physical") mail regularly for over a hundred years, causing mail to be recognized as a reasonably reliable medium for business and personal communication.

Unfortunately, physical mail has its disadvantages. Physical mail requires paper, a legible physical mailing address and proper postage. Writing and mailing a physical letter or postcard takes time and work and costs money. Thus, many people avoid sending physical mail unless the information to be communicated justifies the effort.

Physical mail can also be slow. While it may at one time have been acceptable to wait a day, week or month for physical mail to reach a recipient, today's lightning-fast society seems to have lost its patience. Hence, physical mail has earned a most unflattering appellation: "snailmail."

The result of all of the above is that people have adapted to the idiosyncracies of both e-mail and physical mail. The following example illustrates these idiosyncracies.

A sender wishes to send a simple message to several recipients. Four are e-mail capable; three are not. Of the four, the sender has e-mail addresses for only three. Of these, two are regular e-mail users and are good about checking their e-mailboxes. (Unfortunately, one's e-mailbox is behind a firewall that truncates messages longer than a kilobyte.) The third recipient checks his e-mailbox religiously every two months (unbeknownst to the sender).

To communicate with this disparate lot, the sender must prepare his message in two forms: e-mail messages for the three recipient the prospective sender knows to be e-mail-capable (one of which is almost certainly bound to receive his message late) and physical mail messages for the rest (including the one who could have received his message in e-mail form). For each physical mail message, the sender must print out the message, enclose it in an envelope, write a physical mailing address on the envelope, supply the envelope with sufficient postage and take the envelope to a mailbox (perhaps requiring a drive). Even after having expended the effort, the sender cannot feel comfortable that all recipients will receive their respective messages.

It is apparent that much of this could be substantially improved. What is needed in the art is a more effective, efficient and comprehensive way to communicate with people, not only those who are e-mail-capable, but also those who are reachable only by way of physical mailing addresses.

SUMMARY OF THE INVENTION

To address the above-discussed deficiencies of the prior art, the present invention provides systems, methods, infrastructures and e-mail messages are set forth that allow e-mail to be converted to physical mail form and physically mailed to recipients. The e-mail messages themselves carry the data sufficient to identify the physical mailing address of their intended recipients.

In one aspect of the present invention, a system for generating an e-mail address includes: (1) a recipient information receiver that receives information regarding a recipient sufficient to identify a physical mailing address therefor and (2) an e-mail address generator, coupled to the recipient information receiver, that generates an e-mail address from at least some of the information, the e-mail address employable to cause an e-mail message destined for the recipient to be transmitted to a mail conversion site for conversion to physical form and forwarding to the recipient at the physical mailing address.

In another aspect of the present invention, a method of generating an e-mail address includes: (1) receiving information regarding a recipient sufficient to identify a physical mailing address therefor and (2) generating an e-mail address from at least some of the information, the e-mail address employable to cause an e-mail message destined for the recipient to be transmitted to a mail conversion site for conversion to physical form and forwarding to the recipient at the physical mailing address.

In another aspect of the present invention, an e-mail message includes: (1) a body and (2) a header having physical mailing address data located in an address therein that is employable to forward information contained in the body to a physical mailing address in physical mail form.

In another aspect of the present invention, a system for forwarding an e-mail message includes: (1) an e-mail message receiver that receives an e-mail message destined for a recipient and extracts physical mailing address data from a header thereof and (2) a physical mail generator, coupled to the e-mail message receiver, that generates physical mail from at least a portion of a body of the e-mail message, employs the physical mailing address data to address the physical mail and queues the physical mail for physical mailing to the recipient.

In another aspect of the present invention, a method of forwarding an e-mail message includes: (1) receiving an e-mail message destined for a recipient, (2) extracting physical mailing address data from a header of the e-mail message, (3) generating physical mail from at least a portion of a body of the e-mail message, (4) employing the physical mailing address data to address the physical mail and (5) queuing the physical mail for physical mailing to the recipient.

In another aspect of the present invention, an e-mail to physical mail conversion infrastructure includes: (1) a site that receives e-mail messages from senders and destined for respective recipients, each of the e-mail messages including: (1a) a body and (1b) a header having physical mailing address data located in an address therein, (2) an e-mail message receiver, associated with the site, that extracts the physical mailing address data and (3) physical mail generators, coupled to the e-mail message receiver, that generate physical mail from at least a portion of the body of the each of the e-mail messages, employ the physical mailing address data to address the physical mail and queue the physical mail for physical mailing to the recipients.

For purposes of the present invention, a "physical mailing address" is any address to or from which a conventional physical mailing system, such as the United States Postal Service, United Parcel Service, Federal Express (FedEx) or foreign post office or service can deliver or pick up. A "physical mailing address" is not a computer, computer network or telecommunications system address. "Physical mailing addresses" are therefore real-world, and not virtual. A "physical return address" is the physical mailing address of the sender or some other party designated to receive a reply to the e-mail message from the recipient.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
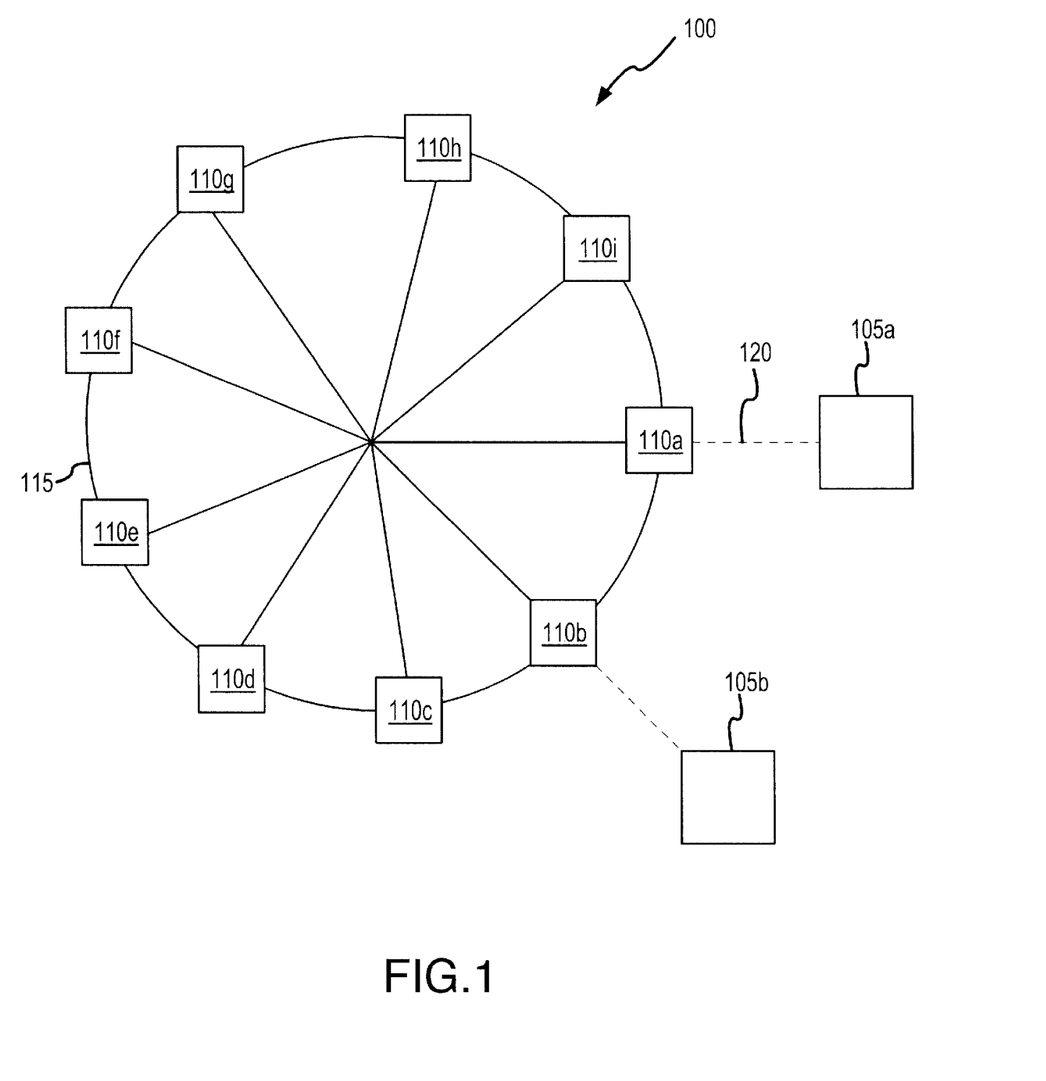
FIG. 1 illustrates a high-level block diagram of an exemplary distributed network with which the principles of the present invention may be suitably used.

Referring initially to FIG. 1, illustrated is a high-level block diagram of an exemplary distributed network (generally designated 100) with which the principles of the present invention may be suitably used to support e-mail to physical mail conversion according to some embodiments of the present invention. The distributed network 100 illustratively includes a plurality of computer systems 110a, 110b, 110c, 110d, 110e, 110f, 110g, 110h, 110i that are illustratively coupled together to form the Internet 115.

The Internet 115 includes the World Wide Web. The World Wide Web is not itself a network, but rather an "abstraction" maintained on top of the Internet 115, effected by a combination of browsers, server sites (as may be hosted on the plurality of computer systems 110a, 110b, 110c, 110d, 110e, 110f, 110g, 110h, 110i) HyperText Markup Language ("HTML") pages and the like.

Although the illustrated embodiment is suitably implemented for and used over the Internet 115, the principles and broad scope of the present invention may be associated with any appropriately arranged computer, communications, multimedia or other network, whether wired or wireless. Further, though the principles of the present invention are illustrated using a single computer system, such as one of the plurality of computer systems 110a, 110b, 110c110d, 110e, 110f, 110g, 110h, 110i, alternate embodiments within the scope of the same may include more than a single computer system.

The exemplary network 100 is assumed to include a plurality of (assumed) insecure communication channels that operate to intercouple ones of the various computer systems 110a, 110b, 110c, 110d, 110e, 110f, 110g, 110h, 110i of the network 100. The concept of communication channels is known and allows insecure communication of information among ones of the intercoupled computer systems (the Internet employs conventional communication protocols, such as SMTP, that are also known). A distributed network operating system executes on at least some of computer systems 110a, 110b, 110c, 110d, 110e, 110f, 110g, 110h, 110i and may manage the insecure communication of information therebetween. Distributed network operating systems are also known.

FIG. 1 also illustrates first and second user's computer systems 105a, 105b, which are assumed, for purposes of the following discussion, to be associated with first and second e-mail senders, respectively.

The first user's computer system may be associated with a particular computer system 110a (such association denoted by a broken line 120. The particular computer system 110a acts as a home site for the first user's computer system and a provider of Internet service.

Figure 2:
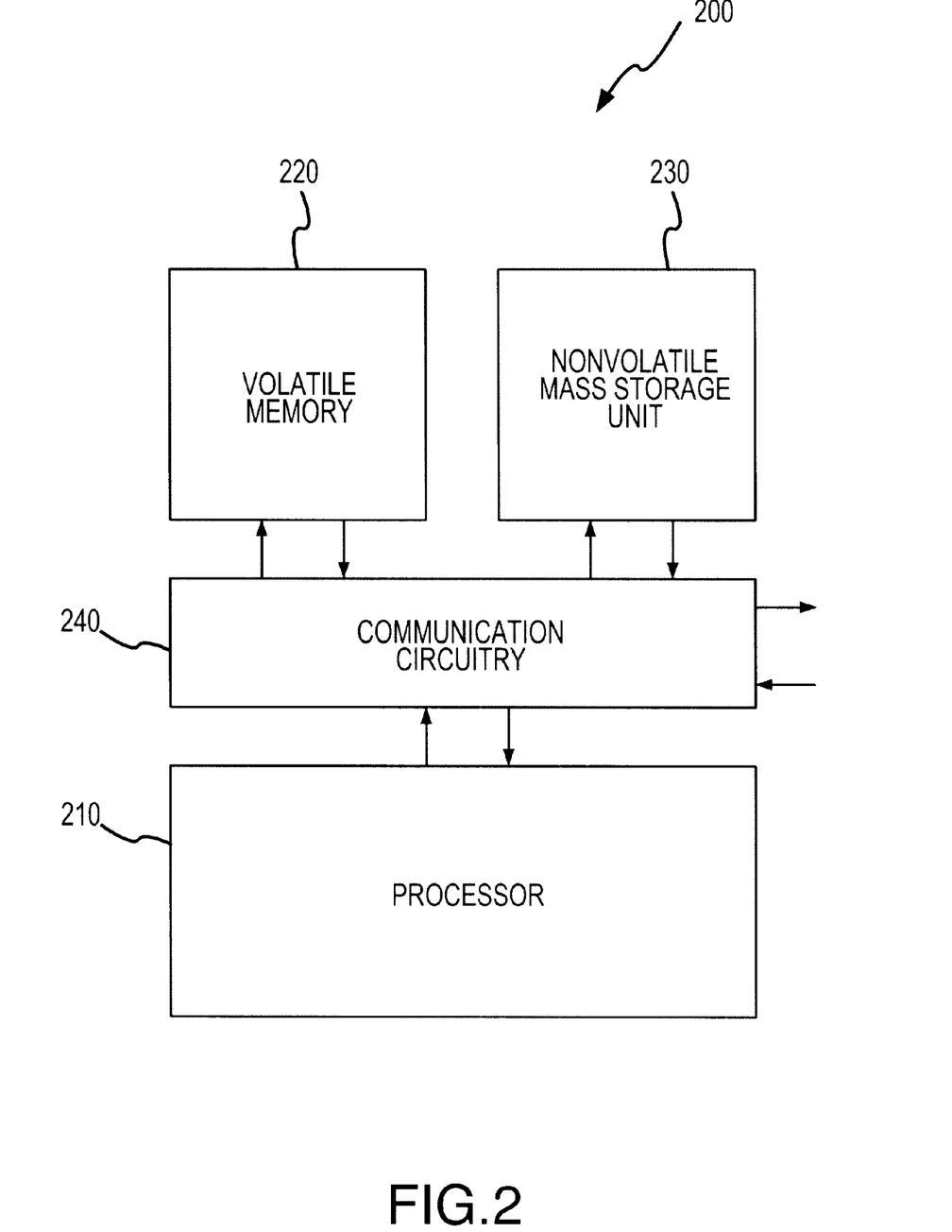
FIG. 2 illustrates a block diagram of a computer system that may be employed in the network of FIG. 1 to provide an environment within which portions of the present invention can operate.

Turning now to FIG. 2, illustrated is a block diagram of data processing and storage circuitry, generally designated 200, that may be employed in the network of FIG. 1 to provide an environment within which certain aspects of the present invention can operate. The circuitry 200 comprises a processor 210, volatile memory 220, a nonvolatile mass storage unit 230 and communication circuitry 240.

The circuitry 200 illustrated in FIG. 2 is intended to represent a wide array of computing platforms. Accordingly, the circuitry 200 may be a mainframe, minicomputer or personal computer ("PC"). The present invention is not limited whatsoever to a particular class of computing platform. With reference back to FIG. 1 and continuing reference to FIG. 2, each of the plurality of computer systems 110a, 110b, 110c, 110d, 110e, 110f, 110g, 110h, 110i and the first and second user's computer systems 105a, 105b may have the circuitry illustrated in FIG. 2 associated therewith.

Figure 3:
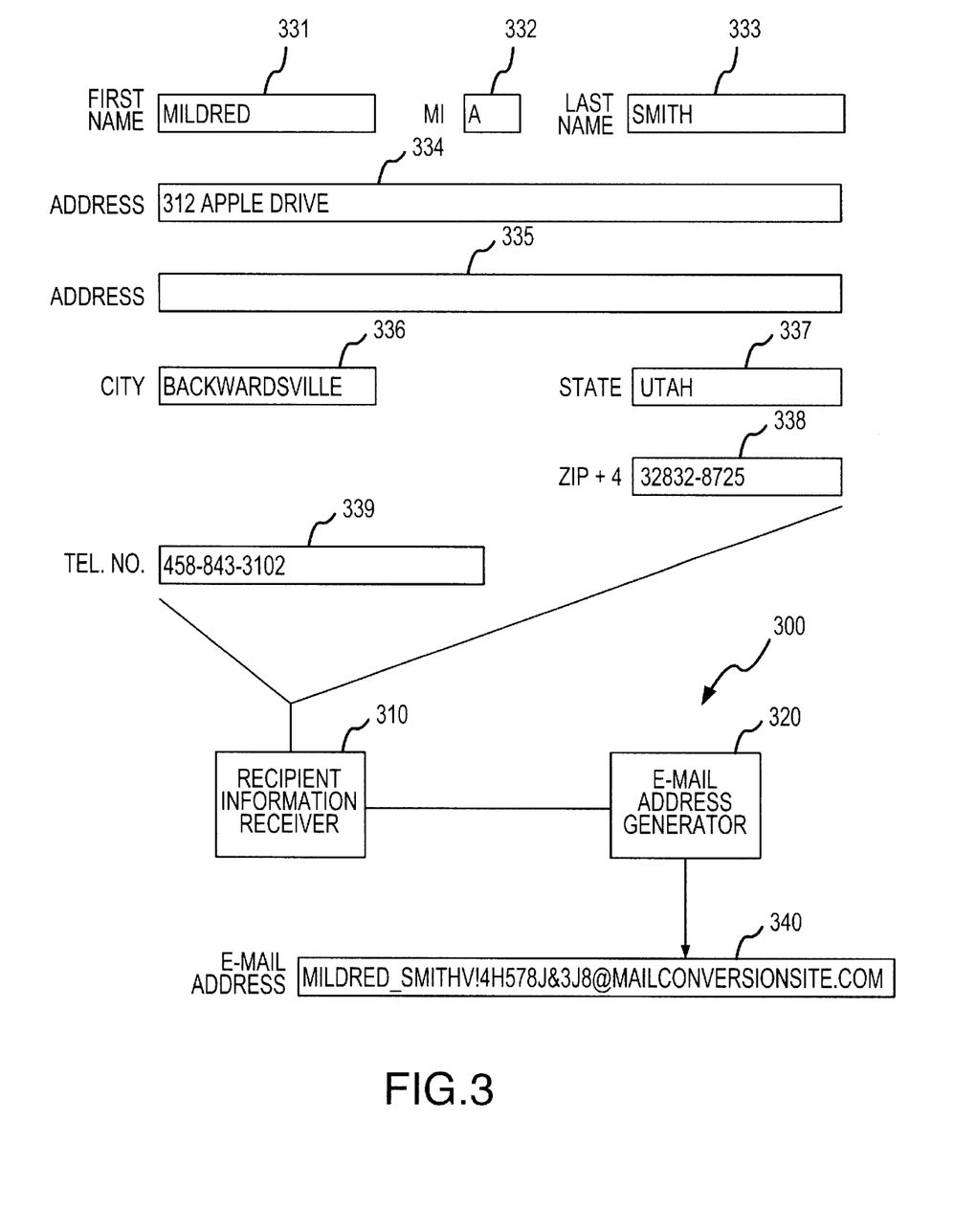
FIG. 3 illustrates a system for generating an e-mail address constructed according to the principles of the present invention and operable within the network of FIG. 1 or the computer system of FIG. 2.

Turning now to FIG. 3, illustrated is a system for generating an e-mail address constructed according to the principles of the present invention and operable within the network of FIG. 1 or the computer system of FIG. 2. The system, generally designated 300, is illustrated as comprising a recipient information receiver 310 and an e-mail address generator 320. The system 300 may be embodied as a sequence of executable software instructions that execute locally on a particular user's computer system (either separate from, or as an integral part of, an e-mail client, such as Outlook Express ™ or Eudora™) or centrally at a mail conversion (perhaps World Wide Web) site. In either case, a user can gain access to the system 300 to generate e-mail addresses as desired.

The recipient information receiver 310 is primarily responsible for gathering such information that may be deemed sufficient to generate an e-mail address for a particular intended recipient. In the illustrated (and preferred) embodiment of the present invention, the e-mail address is unique to the intended recipient.

The recipient information receiver 310 may gather such information by presenting one or more data fields that serve to prompt a user to provide such information in a structured manner. In the specific example given in FIG. 3, the recipient information receiver 310 presents a first name field 331, a middle initial field 332, a last name field 333, address fields 334, 335, a city field 336, a state field 337, a ZIP+4 field 338 and a telephone number field 339. Of course, the recipient information receiver 310 may present fewer, more or different fields than these, as a particular application may find advantageous.

Thus presented with these fields 331, 332, 333, 334, 335, 336, 337, 338, 339, the user begins to provide information. When the user believes that he has provided as much information concerning the intended recipient as he can, he can indicate so by submitting the information to the recipient information receiver in a conventional manner (such as by clicking an appropriate button or pressing an "enter" key).

The recipient information receiver 310 then tests the information to determine whether the information is correct or sufficient to generate an e-mail address. If not, the recipient information receiver 310 prompts the user to supply correct or more information. If not, the recipient information receiver 310 passes the information to the e-mail address generator 320.

The e-mail address generator 320 manipulates the information according to a predetermined process to yield an e-mail address that complies with applicable standards and thus is handled in a standard manner by network resources. If the network is the Internet, the applicable standard may be SMTP.

The best way to illustrate how the system 300 can function to generate an e-mail address from information regarding an intended recipient is by way of example.

A user wishes to generate an e-mail address for his Aunt Mildred. For any one of a host of potential reasons, the user finds e-mail access to Aunt Mildred wanting. Accordingly, the user has assembled the following information regarding Aunt Mildred:

Mildred A. Smith

312 Apple Drive

Backwardsville, Utah 32832-8725

458-843-3102

Assuming that the user's screen displays the fields 331, 332, 333, 334, 335, 336, 337, 338, 339, the user enters the information accordingly:

first name field 331—"Mildred"

middle initial field 332—"A"

last name field 333—"Smith"

address field 334—"312 Apple Drive"

city field 336—"Backwardsville"

state field 337—"Utah"

ZIP+4 field 338—"32832-8725"

telephone number field 339—"458-843-3102"

The user then submits the information to the recipient information receiver 310.

The recipient information receiver 310 may then test the information to determine whether it is complete (e.g., whether all, or at least required, fields contain information). In this example, the user has diligently placed information in all fields.

The recipient information receiver 310 may then test the information to determine whether it is correct (e.g., contains enough characters of the right type). This may be done in many ways. It should be apparent to those skilled in the pertinent art that these accuracy tests may be performed with or without reference to a database of known names, addresses and telephone numbers. The database, if so employed, may be local or on a network (such as is the case with Internet address books).

Having tested the completeness and accuracy of the information, the recipient information receiver 310 then passes some or all of the information to the e-mail address generator 320 for address generation.

Returning to the example at hand, it happens to be that either the ZIP+4 code or the telephone number information provides sufficient physical mailing address data to generate an e-mail address unique to the intended recipient (this may not always be the case). For reasons that will become apparent, it is desirable in this example (but certainly not necessary) to include the name of the intended recipient in the generated e-mail address. The recipient information receiver 310 accordingly passes the contents of the first and last name fields 331, 333 and perhaps the contents of the telephone number field 339 to the e-mail address generator 320.

In response, the e-mail address generator 320 generates an e-mail address from the passed information. This e-mail address is represented in FIG. 3 by an e-mail address field 340.

The e-mail address may be, for example, "mildred_smith328328725@mailconversionsite.com". It should be apparent upon a brief study of the resulting address that it consists of the intended recipient's first name, followed by an underscore character, followed by the intended recipient's last name, followed by the intended recipient's ZIP+4 code information. As will be explained more fully, "mailconversionsite.com" is the domain name (arbitrarily chosen for this example) of an e-mail to physical mail forwarding system that receives e-mail messages sent in the future to the generated e-mail address, converts the generated e-mail address into a physical address, prints the body of the e-mail message and queues the printed message for physical delivery to the intended recipient.

In one embodiment of the present invention, an e-mail client interface then prompts the user to add at least a portion of the information regarding the intended recipient and the e-mail address to the user's address book (commonly associated with an e-mail client). Alternatively, the e-mail client interface may automatically add at least the portion of the information and the e-mail address to the address book.

It should be apparent that the above e-mail address is but one example taken from a myriad of other possibilities. Some of the other possibilities will now be set forth.

The example calls for the intended recipient's first and last names to form part of the generated e-mail address, because it is desirable that the user be able to determine the intended recipient to whom the e-mail address belongs. Assuming a desire to include some portion of the intended recipient's name, the e-mail address generator 320 may use the intended recipient's first initial and last name, viz. "m_smith", eliminate the underscore, viz. "mildredsmith" or use only the first name, viz. "mildred". Of course, neither the first nor last name is necessary at all.

The number that follows the intended recipient's name happens to be the intended recipient's ZIP+4 code (only a portion of the total amount of information provided by the user), represented in plaintext. Alternatively, the intended recipient's ZIP+4 code may be encrypted (perhaps by way of a symmetric encryption algorithm), augmented with other information to guarantee that the e-mail address corresponds to a single physical address or both. Alternatively, the number that follows the intended recipient's name could be the intended recipient's telephone number, represented in plaintext, encrypted or augmented with other information. Following are just a few of the many possibilities:

mildred_smith328328725@mailconversionsite.com
    m_smith328328725@mailconversionsite.com
    mildred328328725@mailconversionsite.com
    m.smith328328725@mailconversionsite.com
    msmith_328328725@mailconversionsite.com
    mildred_smithV!4h578J&3j8@mailconversionsite.com (encrypted ZIP+4)
    mildred_smith4588433102@mailconversionsite.com (telephone number)
    mildred_smith_312_Apple_Drive_Backwardsville_Utah_32832-8725@mailconversionsite.com (everything but telephone number in plaintext)
    m_smith^440Kg-050543Hu$@mailconversionsite.com (encrypted telephone number)

The specific technique that the e-mail address generator 320 employs to generate the e-mail address is not important to the present invention. However, those skilled in the pertinent art should recognize that (1) the resulting e-mail address should comply with applicable standards (which may be SMTP) and (2) the e-mail to physical mail converter should employ a corresponding technique to translate the e-mail address back into a physical mailing address. Purely as a matter of preference, the e-mail address should be shorter rather than longer (to be less cumbersome) and should include some plaintext portion of the intended recipient's name (to allow the user to identify whose e-mail address it is).

Also, purely as a matter of preference, the characters that follow the intended recipient's name should alone be sufficient to identify the physical mailing address for the intended recipient. If such is not the case, the e-mail converter will have to factor in the intended recipient's name when forming the appropriate physical mailing address. Inadvertent errors may thereby result due to typographical errors made by the user while entering information employed to generate the e-mail address.

Figure 4:
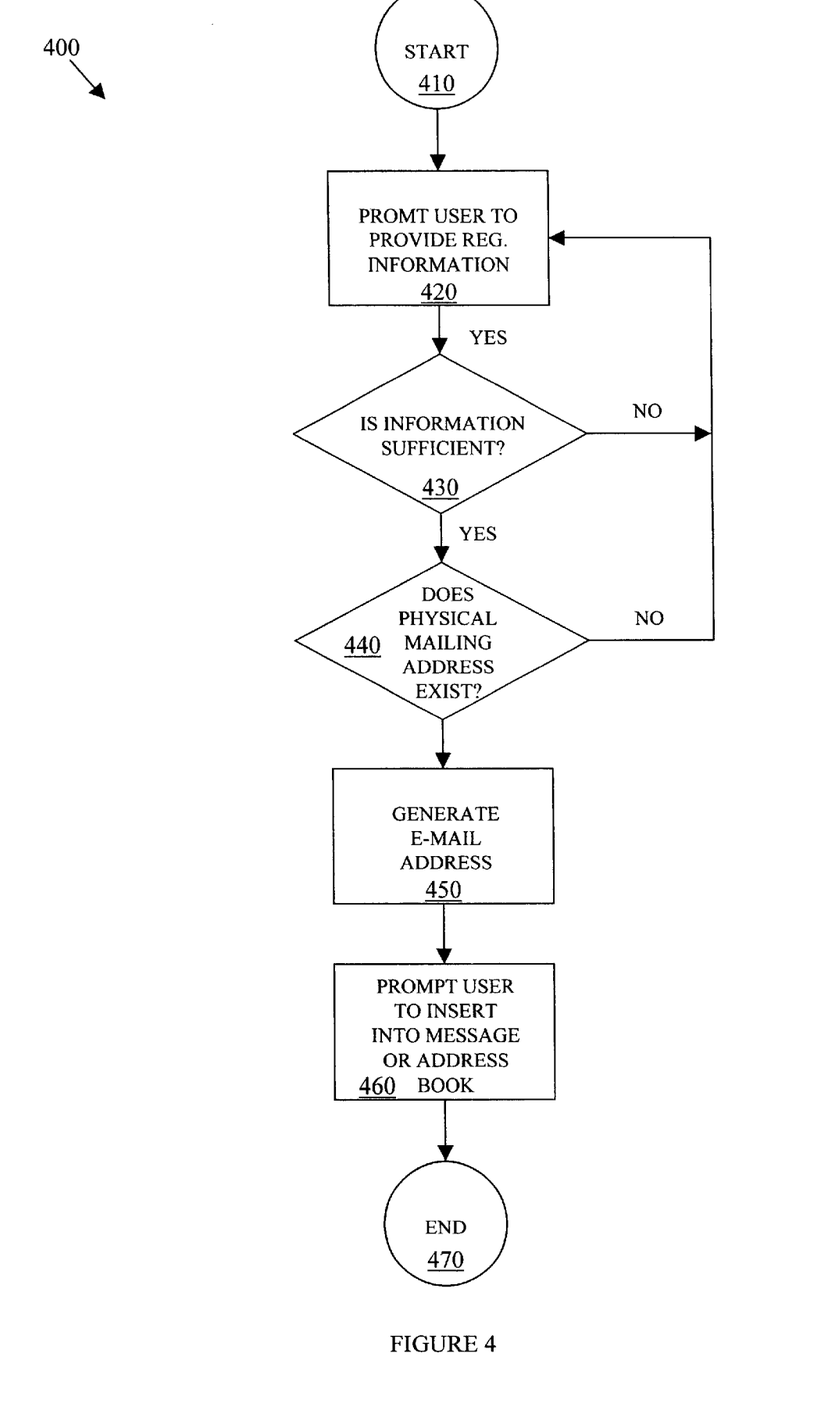
FIG. 4 illustrates a method of generating an e-mail address carried out according to the principles of the present invention and within the network of FIG. 1 or the computer system of FIG. 2.

Turning now to FIG. 4, illustrated is a method of generating an e-mail address carried out according to the principles of the present invention and within the network of FIG. 1 or the computer system of FIG. 2. The method, generally designated 400, begins in a start step 410, when a user wishes to generate an e-mail address.

In a step 420, the user is prompted to provide information regarding an intended recipient. Once the user submits this information, the information may be tested in an optional decisional step 430 for sufficiency. Next, in an optional decisional step 440, the information may be tested for accuracy or existence, perhaps with reference to a database of physical mailing addresses). If the information is insufficient or inaccurate, or refers to a nonexistent physical address, the user is prompted to complete or correct the information (returning to the step 420).

If testing is performed and the information is sufficient and accurate, an e-mail address is generated (in a step 450) employing at least some of the information. The generating may involve using plaintext or encrypting plaintext to yield ciphertext. The generating also may involve inclusion of a domain name of a mail conversion site, such that e-mail messages are correctly routed to such site for conversion to physical mail and forwarding through a physical mail system.

Next, in a step 460, the user is prompted to insert the e-mail address into a particular message (for one-time use) or the user's address book (to allow continuing use). Finally, the method 400 ends in an end step 470, an e-mail address having been generated for the sender's benefit.

Figure 5:
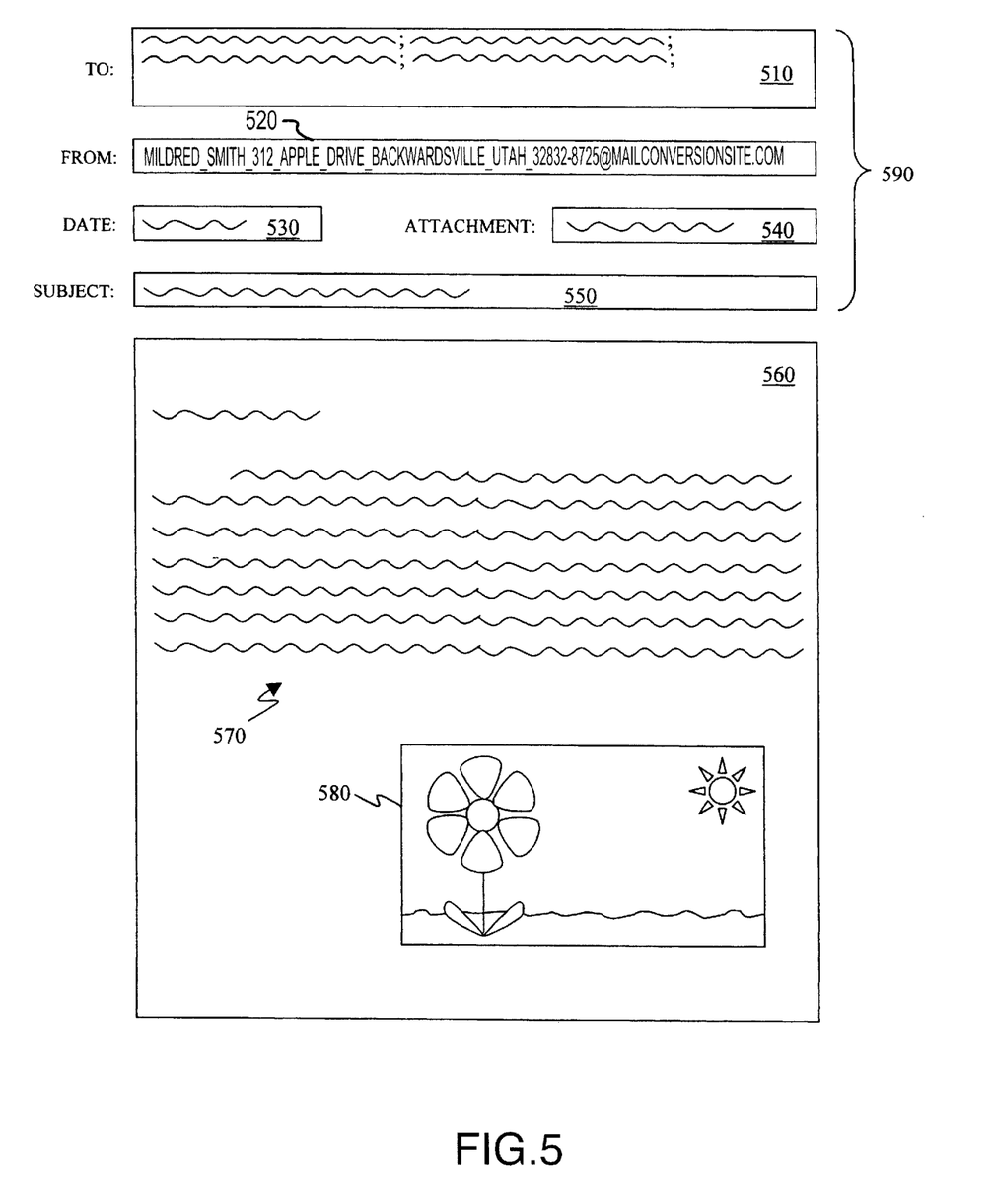
FIG. 5 illustrates an e-mail message, constructed according to the principles of the present invention and transmissible through the network of FIG. 1, that itself carries data sufficient to identify a physical mailing address of its intended recipient.

Turning now to FIG. 5, illustrated is an e-mail message, generally designated 500, constructed according to the principles of the present invention and transmissible through the network 100 of FIG. 1, that itself carries data sufficient to identify a physical mailing address of its intended recipient.

The e-mail message 500 comprises a to field 510, a from field 520, a date field 530, an attachment field 540, a subject field 550 and a body 560.

The to field 510 contains one or more e-mail addresses of recipients of the e-mail message 500, including at least one destination e-mail address generated according to the principles of the present invention. (Actually, some e-mail programs and remailers allow the recipients' e-mail addresses to be stricken from the message. So, a given e-mail message may be blank or contain some nondescript message to the effect of: "intended recipients").

The from field 520 contains the e-mail address of the sender of the e-mail message 500. This allows the recipient to reply to the e-mail message 500 if desired. (Replies and return addresses will be covered in detail below.)

The date field 530 contains a date the e-mail message was sent. The attachment field 540 contains a filename of a file attached to the e-mail message 500. (Attachments will be covered in detail below.) The subject field 550 contains an optional but desirable brief statement, supplied by the sender, of the subject of the e-mail message 500. The to field 510, from field 520, date field 530, attachment field 540 and subject field 550 constitute a header 590 of the e-mail message 500. The header 590 and the body 560 together constitute the e-mail message 500.

The body 560 is illustrated as having two portions: text 570 (e.g., American Standard Code for Information Interchange, or "ASCII," or Hypertext Markup Language, or "HTML") and an attachment 580. (The illustrated attachment 580 happens to be a graphics file illustrating a nice pastoral scene.) All manner of files (such as word processing, spreadsheet; sound and executable program files) may be attached to e-mail messages, but only some are printable; graphics files are certainly printable.

The to field 510 is illustrated as containing the destination e-mail address that contains the physical mailing address data that will eventually be converted into a physical mailing address that, in turn, is employable to forward information contained in the body 560 to a physical mailing address in physical mail form. Placing the destination e-mail address in the to field 510 is advantageous, because the sender does not have to provide such address in the subject field 550, the body 560 or some other field that a standard, such as SMTP, may allow to be associated with an e-mail message. Nonetheless, in alternative embodiments, the physical mailing address data are contained in the subject field 550, the body 560 and even an attachment.

Figure 6:
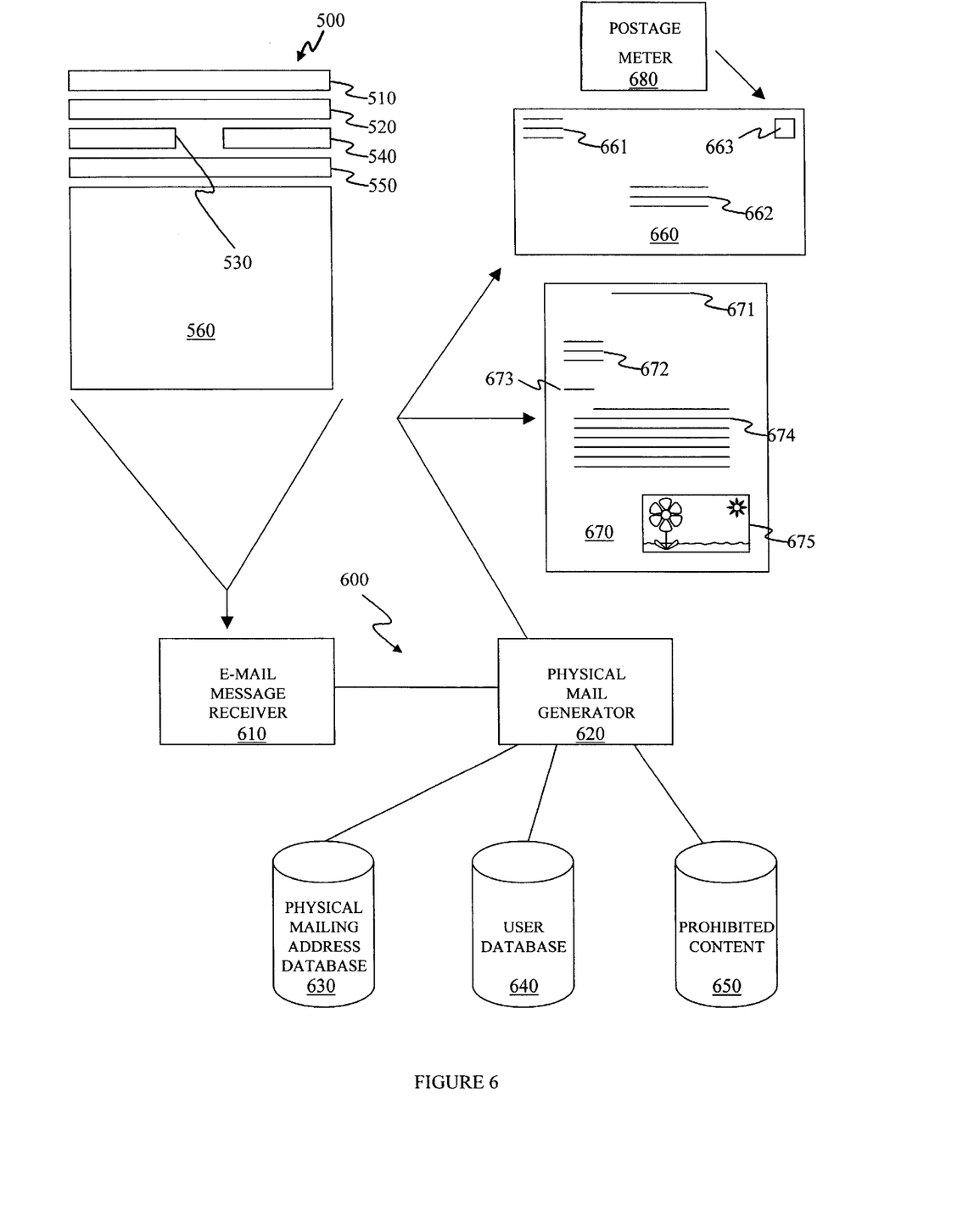
FIG. 6 illustrates a system for forwarding an e-mail message constructed according to the principles of the present invention and operable within the network of FIG. 1.

Turning now to FIG. 6, illustrated is a system, generally designated 600, for forwarding an e-mail message constructed according to the principles of the present invention and operable within the network 100 of FIG. 1.

The system 600 is illustrated as comprising an e-mail message receiver 610 and a physical mail generator 620. In the illustrated embodiment of the present invention, the system 600 is part of a mail conversion site, which may take the form of a World Wide Web site on the Internet.

In a broad sense, the e-mail message receiver 610 receives an e-mail message destined for a recipient and extracts physical mailing address data from a header thereof. In accordance with the description of FIGS. 3, 4 and 5 above, the e-mail message receiver extracts the physical mailing address data from the recipient's e-mail address generated according to the method 400 of FIG. 4 and contained in the to field 510 of the e-mail message 500 of FIG. 5. The e-mail message receiver 610 may need to decrypt some or all of the physical mailing address data. Assuming symmetric encryption was employed to generate the e-mail address, the decryption algorithm employed by the e-mail message receiver should be the analog of the encryption algorithm.

Once the physical mailing address data are extracted, the e-mail message receiver 610 passes the physical mailing address data to the physical mail generator 620.

It may be desirable at this time to ascertain or verify the identity of the sender. Ascertainment or verification serves several advantageous, but not necessary, purposes. First, an unscrupulous sender wishing to employ the system 600 as a mechanism to annoy or scare recipients by barraging them with quantities of mail or threatening messages can be located and stopped. Second, the sender's physical return address can be ascertained and added to physical mail as it is addressed. Third, should it be desired to charge the sender a fee or pay the sender an award for using the system 600, the sender's identity can be verified. The ascertainment or verification of the sender's identity can occur before or after extraction of the physical mailing address data. Senders may be verified by, for example, checking their names against a user database 640 containing names and e-mail addresses of registered senders.

Assuming that registration, if required, is confirmed, the physical mail generator 620 may then test the physical mailing address data to determine whether it is correct. Testing may be skipped if testing was performed when the e-mail address was originally generated. Testing may also be skipped if misaddressed mail is tolerable.

Assuming testing is desirable, the physical mail generator 620 may validate the decrypted physical mailing address against a physical mailing address database 630 containing known, valid physical mailing addresses. The physical mailing address database 630 may be local to the site at which the system 600 is located or on the network (such as is the case with Internet address books).

The physical mail generator 620 may further parse the e-mail message with respect to prohibited content. "Prohibited content" is a broad term encompassing any character, word, phrase, picture or the like that may be deemed inappropriate for forwarding. Accordingly, the physical mail generator 620 may employ a prohibited content database 650 to judge characters, words, phrases and pictures found in the e-mail message. If a match is found, appropriate action (such as refusal to forward, generation of a reply e-mail message to the sender or redaction of the prohibited content before forwarding) can be taken.

The physical mail generator 620 may subject the e-mail message to further tests or filters established according to a policy. For example, a preset limit may be established regarding the maximum number of messages a given sender can send during a given period of time (e.g., 100 per day). Another preset limit may be established regarding the maximum number of messages a given recipient can receive during a given period of time (e.g., 100 per week). Still another preset limit may be established regarding the maximum number of messages a given sender can send to a given recipient during a given period of time (e.g., three per day). Yet another preset limit may be established regarding the maximum number of characters, bytes or pages a given e-mail message can contain (e.g., no more than two pages). Still yet another preset limit may be established regarding the maximum size or resolution (e.g., 640×480 pixels) of an attachment or number of attachments.

Return addresses, while not required by the present invention, are advantageous and will now be considered.

One option is to employ the present invention to embed the sender's physical return address in the sender's e-mail address. While this would work well for purposes of creating a fully addressed piece of physical mail, e-mail capable recipients would receive the same address. When they reply to the e-mail message, their reply would be conveyed through the physical mail system which, while effecacious, is probably not preferred.

Another option is to embed both the sender's and the recipient's physical mailing addresses in the recipient's e-mail address, thereby creating an e-mail address that is sender-dependent. While this again works well for purposes of creating a fully addressed piece of physical mail, e-mail capable recipients would still be hampered in their efforts to reply electronically. Furthermore, a recipient would no longer have a "universal" address; he would instead have a different address for each sender.

Yet another option is to place the sender's return address, encoded or otherwise in some specially defined field in the header of the e-mail message. While possible and perhaps even advantageous, this requires the e-mail message to be formed different than it otherwise would were the recipients all to be e-mail capable. Thus, it may be disadvantageous.

Still another option, and perhaps the one preferred at this time, is to require the sender to supply his physical return address separately (perhaps by separate e-mail message or a visit to a web site. Once supplied, the sender's physical return address can be associated with his regular e-mail address, retrieved from a database and printed whenever an e-mail message bearing the sender's e-mail address is to be converted to physical form.

Assuming that the e-mail message has survived the potential phalanx of tests that may be performed, it comes time for the physical mail generator 620 to create the piece of physical mail that will journey through the physical mail to the recipient. Accordingly, FIG. 6 illustrates an envelope 660 and a message page 670. Before delving into an example of how the envelope 660 and message page 670 can be created, those skilled in the pertinent art should understand that the physical mail can take many alternative forms, including a simple postcard, a foldable postcard, standard windowed or nonwindowed envelope containing a folded message page 670, a large envelope not requiring the message page 670 to be folded and a preformed packet containing the message page 670 and a carbon (such that impact printing on the outside effects formation of writing on the message page 670).

The physical mail generator 620 may address the envelope 660 by printing the recipient's physical mailing address in a field 662 and, optionally, a return address in a field 661. The physical mail generator 620 may also apply postage in a location 663. Alternatively, the physical mail generator 620 may address the physical mail by printing the recipient's physical mailing address and return address on the message page 670 and employing a windowed envelope to allow the addresses to show through.

The physical mail generator 620 creates the message page 670 by printing a date in a field 671, the recipient's physical mailing address in a field 672, a salutation in a field 673, the body of the e-mail message in a field 674 and the attachment, if any, in a location 675. The message page 670 can additionally include a printed advertisement. The content and arrangement of the message page 670 is completely arbitrary and does not limit the present invention.

The physical mail generator 620 next queues the physical mail for physical mailing to the recipient. A conventional (perhaps color) printer and enveloper can be employed to print an envelope 660 and a message page 670, fold the message page 670, stuff the message page 670 into the envelope 660 and apply postage as appropriate (perhaps with the aid of a postage meter 680) or by using a envelope preprinted with postage. An advertising insert (not shown) can be included with the message page.

In an alternative embodiment, the mail message receiver 610 may be associated with a site and the physical mail generator 620 may be located remote from the site, such as a particular post office or depot. In such embodiment, the mail message receiver 610 may test incoming e-mail messages, translate e-mail addresses into physical mailing addresses, format attachments and add graphics (such as backgrounds and borders). The mail message receiver 610 can thus repackage the e-mail message as a file (such as an Adobe print file) that can be transmitted to the physical mail generator 620 for relatively straightforward printing and mailing. This embodiment has the advantage of centralizing substantial e-mail processing and distributing the actual printing and mailing.

Figure 7:
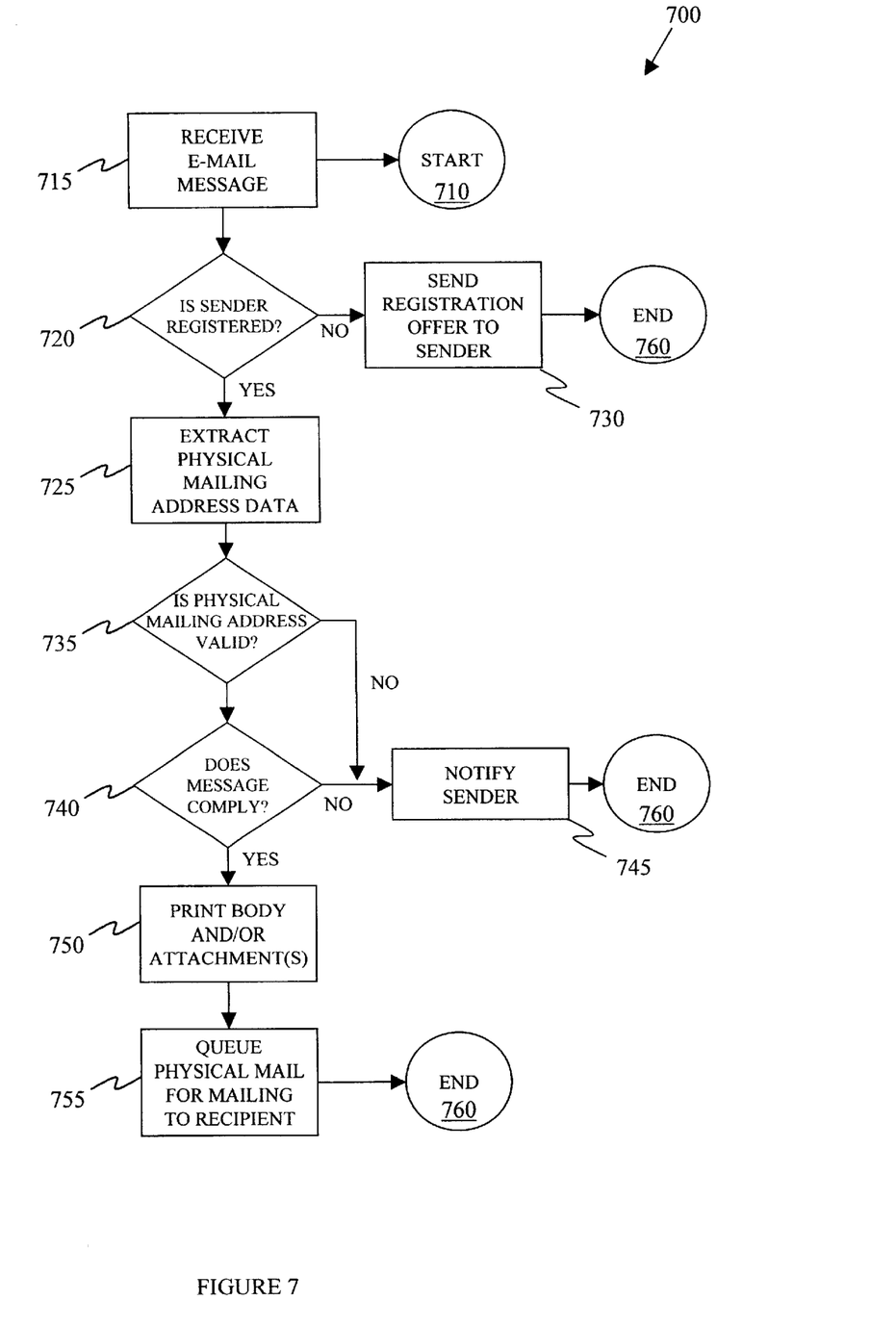
FIG. 7 illustrates a method of forwarding an e-mail message carried out according to the principles of the present invention and within the network of FIG. 1.

Turning now to FIG. 7, illustrated is a method, generally designated 700, of forwarding an e-mail message carried out according to the principles of the present invention and within the network of FIG. 1. The method 700 begins in a start step 710, wherein an e-mail message bearing an appropriate destination e-mail address travels through a computer network. The e-mail message is received in a step 715. In an optional decisional step 720, it is determined whether the sender of the message is registered (perhaps by comparing the address in the from field of the e-mail message with a user database). If the sender is not registered, the method may call for the sender to be invited to register by means of a registration offer by return e-mail (a step 730).

Assuming the sender is registered, processing continues to a step 725, wherein physical mailing address data are extracted from the e-mail message. Next, in an optional decisional step 735, the physical mailing address of the recipient is derived from the e-mail address and checked against a database of valid physical addresses. If the physical mailing address is invalid, the sender may be so notified in a step 745.

If the physical mailing address is valid, the e-mail message may be tested to determine whether it complies with policy. As set forth above with respect to FIG. 6, the e-mail message may be tested to determine whether it includes prohibited content, is too long, violates message page or volume limits or the like. If the e-mail message violates policy, the sender may be so notified (the step 745).

If the e-mail message complies with policy, the body and/or attachment(s) can be printed and any envelope addressed in a step 750. The result of such printing (and perhaps folding and stuffing) is a piece of physical mail.

In a step 755, the piece of physical mail is queued for physical mailing to the recipient. The method 700 ends in an end step 760.

Figure 8:
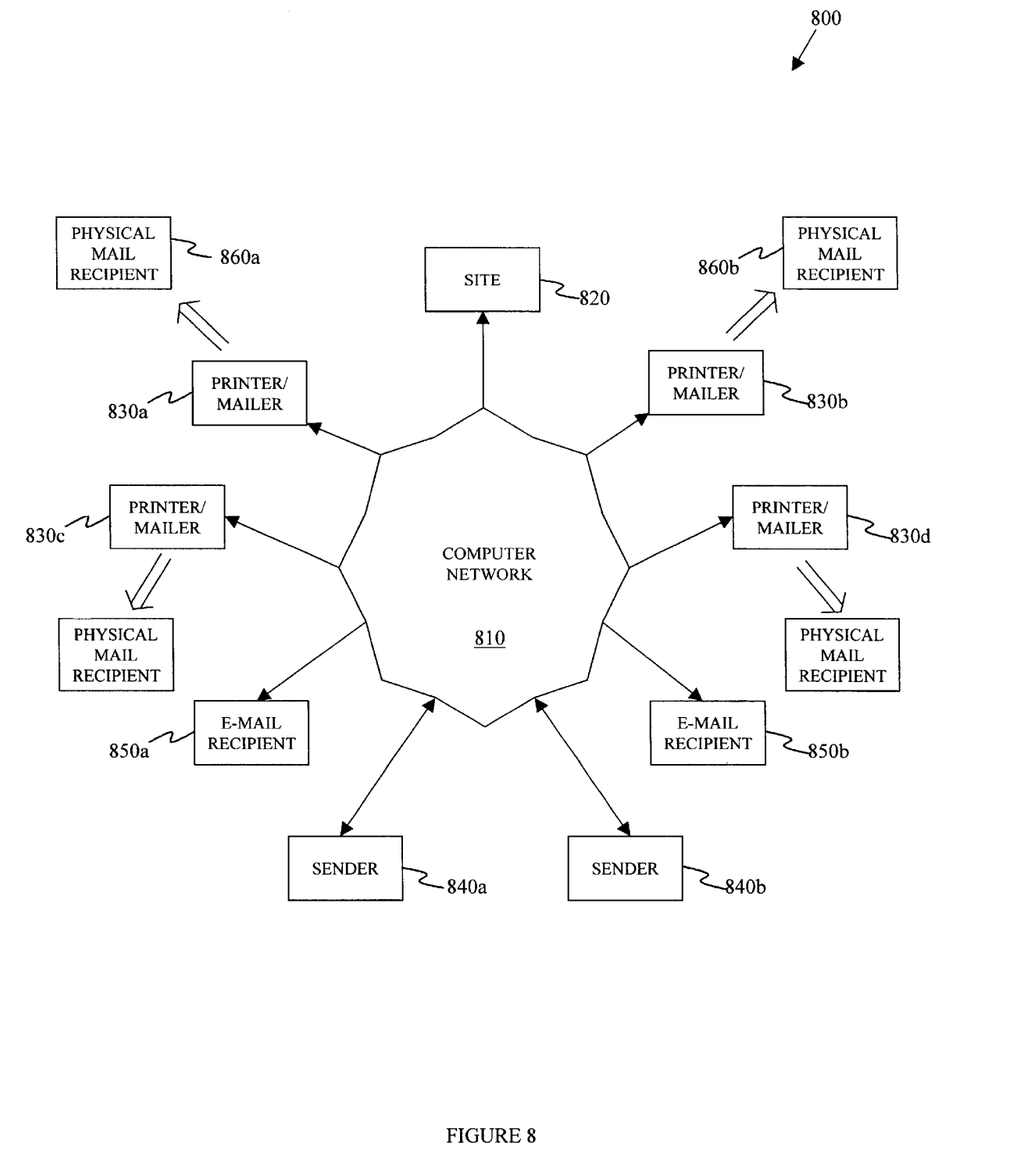
FIG. 8 illustrates an e-mail to physical mail conversion infrastructure constructed according to the principles of the present invention and operable within the network of FIG. 1.

Turning now to FIG. 8, illustrated is an e-mail to physical mail conversion infrastructure constructed according to the principles of the present invention and operable within the network of FIG. 1.

The infrastructure 800 is only one exemplary embodiment, but serves to illustrates how scalable the present invention can be. A computer network 810, which may, but is not constrained to, be the Internet, provides a medium for permitting communication between various other systems that make up the whole of the infrastructure 800.

A site 820 and first, second third and fourth printer/mailers 830a, 830b, 830c, 830d are shown coupled to the computer network 810. Various computer systems are also coupled to the computer network. Some of these computer systems are associated with e-mail senders (sender 840a, 840b). Other of these computer systems are associated with recipients who actually have e-mail-receiving capability (e-mail recipients 850a, 850b).

The first, second third and fourth printer/mailers 830a, 830b, 830c, 830d may be centered in a single location, somewhat distributed among several locations or widely distributed, such that one or more printer/mailers is located within each U.S. ZIP code or by each foreign mail station.

While certainly more capital-intensive and not necessary to the present invention, wide distribution of printer/mailers may prove to be the most efficient arrangement. Wide distribution of printer/mailers allows the postal service to deliver the resulting physical mail to its intended recipients in one step; each piece of mail is distributed by a single letter carrier and inter-ZIP transfers are avoided. The result is that delivery of the pieces of physical mail can be carried out same-day or in one day. This can significantly decrease mailing time and perhaps can merit reduced postage.

By way of example, one of the senders (e.g., the sender 840a) may wish to send an e-mail message to four recipients. Perhaps two of the recipients are e-mail capable (e.g., the e-mail recipients 850a, 850b) and two of the recipients are not e-mail capable (e.g., recipients 860a, 860b, associated respectively with the printer/mailers 830a, 830b). Accordingly, the sender 840a provides conventional e-mail addresses for the e-mail recipients 850a, 850b and generates e-mail addresses according to the present invention for the recipients 860a, 860b. The resulting e-mail message may be addressed as follows:

To: rgeoffries@flash.net;
        bridgettu2@att.worldnet.com;
        maggie_ray5i3u$f67h493@mailconversionsite.com;
        mildred_
            smithV!4h578J&3j8@mailconversionsite.com The first destination address is for the e-mail recipient 850a. The second destination address is for the e-mail recipient 850b. The third destination address is for the recipient 860a. The fourth address is for the recipient 860b.

The sender prepares the remainder of the e-mail message and sends it. The e-mail message travels directly to the e-mail recipients 850a, 850b. The e-mail message also travels to the site 820, where, among other things, the e-mail addresses are decrypted, converted into physical mailing addresses, tested and verified. The e-mail message may then be repackaged with the physical mailing addresses (e.g., contained in an additional attachment) and forwarded, to each of the printer mailers 830a, 830b. (This convert-repackage-and-forward technique allows the processing involved in decrypting, converting and testing to be performed centrally at the site 820, rather than at each of the printer/mailers 830a, 830b.) The printer/mailers 830a, 830b, receive the e-mail messages where they are printed, stuffed into a properly addressed envelope and queued for physical mailing to the recipients 860a, 860b. Barring unforeseen delays, the recipients 860a, 860b should have their physical mail in hand later that day, or the next day at the latest.

Although the present invention has been described in detail, those skilled in the art should understand that they can make various changes, substitutions and alterations herein without departing from the spirit and scope of the invention in its broadest form.

What is claimed is:

1. A system for generating an electronic mail (e-mail) address, comprising:

a recipient information receiver that receives information regarding a recipient sufficient to identify a physical mailing address therefor; and     an e-mail address, generator coupled to said recipient information receiver, wherein said e-mail address generator generates an e-mail address from at least some of said information, wherein at least a portion of said e-mail address is encrypted and positioned in a header of an e-mail message destined for said recipient, and wherein said e-mail address is employable to cause said e-mail message to be transmitted to a mail conversion site where said e-mail message is:

converted to physical form; and forwarded to said recipient at said physical mailing address.

2. The system as recited in claim 1 wherein said e-mail address comprises a plaintext portion containing at least a portion of a name of said recipient.

3. The system as recited in claim 1 wherein said encrypted portion is derived from one of:

at least some of said physical mailing address, and a telephone number of said recipient.

4. The system as recited in claim 3 wherein said encrypted portion is sufficient to identify said physical mailing address for said recipient.

5. The system as recited in claim 1 wherein said recipient information receiver and said e-mail address generator are embodied in a sequence of executable software instructions stored locally on a computer associated with a sender.

6. The system as recited in claim 1 wherein said recipient information receiver and said e-mail address generator are embodied in a sequence-of executable software instructions stored at said mail conversion site.

7. The system as recited in claim 1 further comprising an e-mail client interface that provides at least a portion of said information regarding said recipient and said e-mail address to an address book associated with an e-mail client.

8. The system as recited in claim 1 wherein said e-mail address comprises a domain name of said mail conversion site.

9. The system as recited in claim 1 wherein said e-mail message has an attachment.

10. The system as recited in claim 1 wherein said e-mail message has physical return address data located therein.

11. A method of generating an electronic mail (e-mail) address, comprising:

receiving information regarding a recipient sufficient to identify a physical mailing address therefor; and     generating an e-mail address from at least some of said information, wherein at least a portion of said e-mail address is encrypted and positioned in a header of an e-mail message destined for said recipient, and wherein said e-mail address is employable to cause said e-mail message to be transmitted to a mail conversion site where said e-mail message is converted to physical form and forwarded to said recipient at said physical mailing address.

12. The method as recited in claim 11 wherein said e-mail address comprises a plaintext portion containing at least a portion of a name of said recipient.

13. The method as recited in claim 11 wherein said said encrypted portion is derived from one of:

at least some of said physical mailing address, and a telephone number of said recipient.

14. The method as recited in claim 13 wherein said encrypted portion is sufficient to identify said physical mailing address for said recipient.

15. The method as recited in claim 11 wherein said receiving and said generating are carried out by executing a sequence of executable software instructions stored locally on a-computer associated with a sender.

16. The method as recited in claim 11 wherein said receiving and said generating are carried out by executing a sequence of executable software instructions stored at said mail conversion site.

17. The method as recited in claim 11 further comprising providing at least a portion of said information regarding said recipient and said e-mail address to an address book associated with an e-mail client.

18. The method as recited in claim 11 wherein said e-mail address comprises a domain name of said mail conversion site.

19. The method as recited in claim 11 wherein said e-mail message has an attachment.

20. The method as recited in claim 11 wherein said e-mail message has physical return address data located therein.

* * * * *